United States Patent [19]
Seitter et al.

[11] 4,080,588
[45] Mar. 21, 1978

[54] VEHICLES AND CONTROL CIRCUITS FOR VEHICLE ACCESSORIES

[75] Inventors: Wolf Seitter, Marbach; Hans Prohaska; Willy Bock, both of Bietigheim, all of Germany

[73] Assignee: SWF Spezialfabrik fur Autozubehor Gustav Rau GmbH, Bietigheim, Germany

[21] Appl. No.: 765,756

[22] Filed: Feb. 4, 1977

Related U.S. Application Data

[63] Continuation of Ser. No. 521,872, Nov. 7, 1974, abandoned, which is a continuation of Ser. No. 315,544, Dec. 15, 1972, abandoned.

[30] Foreign Application Priority Data

Dec. 18, 1971 Germany .............................. 2162985

[51] Int. Cl.$^2$ .......................... B60Q 1/38; H02G 3/00
[52] U.S. Cl. ................................. 340/81 R; 307/10 R; 315/217
[58] Field of Search ............... 340/52 F, 66, 73, 81 R, 340/81 F; 307/9, 10 R, 10 LS, 132; 315/200 A, 217, 77

[56] References Cited

U.S. PATENT DOCUMENTS

| 3,571,610 | 3/1971 | Hayden | 307/132 |
| 3,576,444 | 4/1971 | Roberts | 340/81 X |
| 3,648,057 | 3/1972 | Sognefest et al. | 307/10 R |
| 3,651,454 | 3/1972 | Venemh | 340/52 F |
| 3,668,678 | 6/1972 | Porter | 340/251 |
| 3,673,564 | 6/1972 | Kammerer | 340/81 R |
| 3,704,379 | 11/1972 | Slehofer | 307/10 LS |
| 3,711,827 | 1/1973 | Houseman | 340/52 F |
| 3,916,375 | 10/1975 | Sumiyoshi et al. | 340/52 F |

FOREIGN PATENT DOCUMENTS

| 1,281,490 | 10/1968 | Germany | 340/81 R |
| 1,397,494 | 4/1975 | United Kingdom | 340/81 F |

*Primary Examiner*—Donald J. Yusko
*Attorney, Agent, or Firm*—Toren, McGeady and Stanger

[57] ABSTRACT

In a vehicle, pulses are passed from a central pulse generator to accessories such as a heater clock, a turn indicator, and a flasher. The indicator and flasher control appropriate vehicle indicator lights with the pulses. Switches in the indicator and flasher enable a gate which passes the pulses from the generator through the indicator, or flasher, to the lamps.

26 Claims, 3 Drawing Figures

VEHICLES AND CONTROL CIRCUITS FOR VEHICLE ACCESSORIES

This is a continuation of application Ser. No. 521,872 filed Nov. 7, 1974, which in turn is a continuation of Ser. No. 315,544 filed Dec. 15, 1972 both now abandoned.

BACKGROUND OF THE INVENTION

This invention relates to vehicles, and particulary to circuits for operating various accessories, such as flashing lights, monitoring devices, in vehicles such as motor vehicles.

Modern motor vehicles, particularly private cars and trucks, utilize indicators, monitoring devices, or both, either as extra accessories or as part of legally prescribed equipment. The operation of such devices depends on the presence of a periodically recurring electrical signal.

Examples of such devices are an electrical time-piece which switches on a heating system at a predetermined time, and turn indicators and flashers which are turned on and off at a predetermined rate. Such devices operate independently. Thus these devices are usually connected to individual control apparatuses. However, it can be seen that, depending on the number of such devices, the expenditures on control apparatuses may represent a considerable proportion of the electrical system for the car, and at the same time represent a number of possible sources of failure.

An object of the invention is to reduce this expenditure.

Another object of this invention is to increase the reliability of the devices concerned.

Still another object of the invention is to eliminate the before mentioned shortcomings.

SUMMARY OF THE INVENTION

According to a feature of the present invention a circuit for operating pulse-controlled indicators, monitoring devices or both, in vehicles, comprises a central pulse generator the output signal of which controls the plurality of independent circuits either directly, or through various switching, relay, or amplifying devices.

According to a preferred embodiment of the present invention, the central pulse generator is in the form of an integrated circuit frequency-stabilized oscillator. Such pulse generators are commercially available for any desired pulse frequency.

According to this embodiment, a turn indicator circuit, when manually operated, enables an AND gate which passes signals from the pulse generator through the turn indicator switch to the appropiate lamps. A monitoring device inserted in series with the lamps responds to the current to the lamps and indicates when one or more of the lamps is operating improperly.

According to another aspect of this embodiment, a make contact of a warning flasher that operates to front lights and to rear lights passes the pulse to these lamps thus the warning flasher switch also requires no timing members of its own.

These and other features of the invention will be pointed out in the claims, forming a part of the specification. Other objects and advantages of the invention will become evident from the following detailed description when read in light of the accompanying drawings.

DETAILED DESCRIPTION OF PREFERRED EMBODIMENTS

Figure 1:
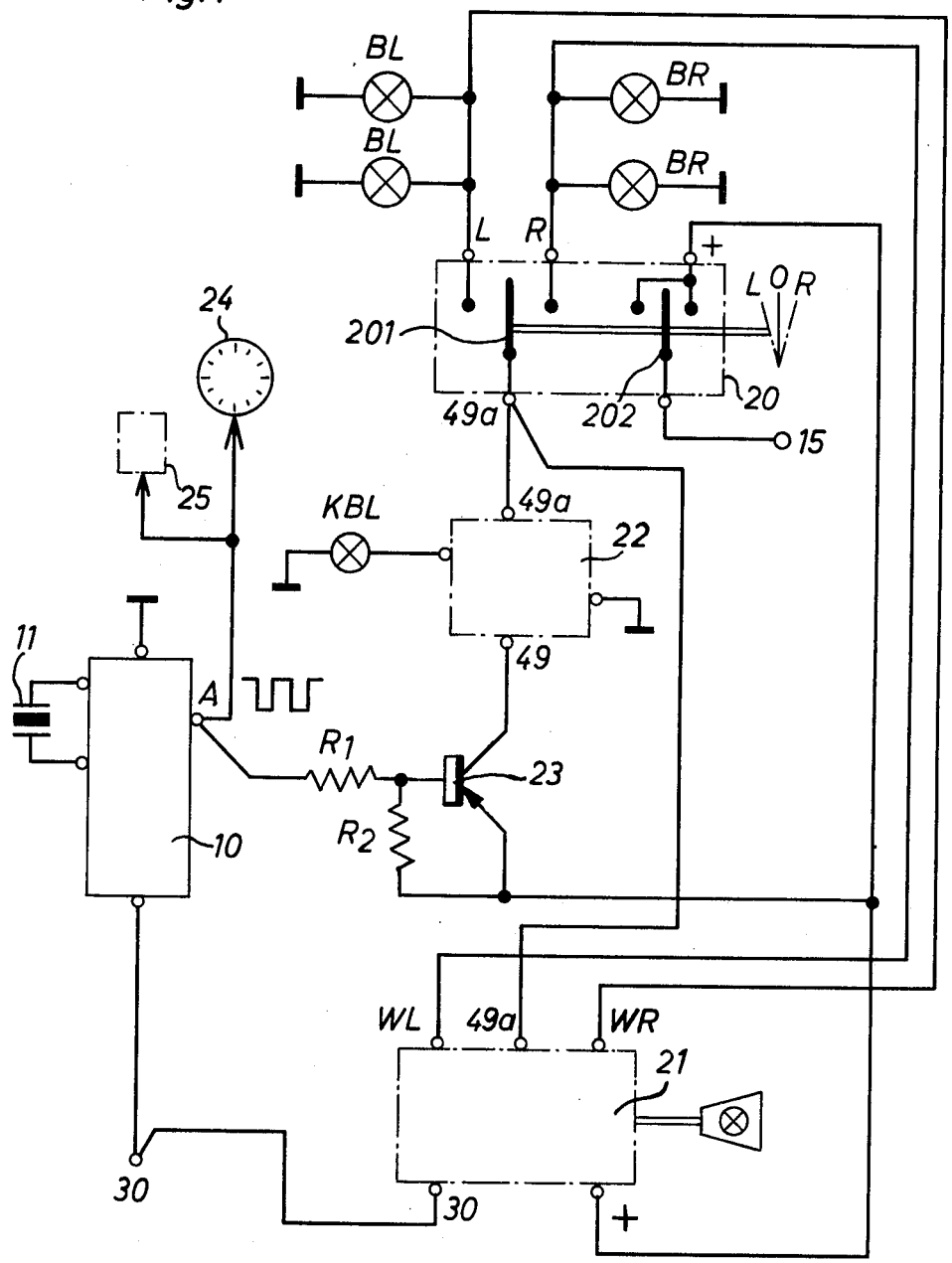
FIGS. 1 and 2 are schematic diagrams illustrating embodiments of the present invention including turn indicator circuits.

In FIG. 1, a vehicle schematically illustrated as V is controlled by operating means OM. A battery B is connected to the operating means OM which includes suitable lamps IL. The vehicle V, and its contents are illustrated only schematically. Their positions in FIG. 1 do not necessarily correspond to the positions they would ordinarily take in a vehicle.

A central pulse generator is formed by an oscillator 10 and a piezoelectric resonator 11 that stabilizes the frequency at which the oscillator operates. Thus, the oscillator 10 delivers a pulse train of predetermined frequency from an output A. Parallel paths from the output A of the oscillator terminate at time-piece or clock 24 (not shown in detail), a time switch 25 (not shown in detail), and at a flashing circuit composed of a turn indicator and a warning flasher. The time piece is operated with an electro-magnet adapted to wind the clock when actuated periodically by the output signal appearing at the output A. The time switch 25 includes a step-by-step switch that switches a heating system on and off.

The flashing circuit includes a transistor 23 that forms a relay and flashing lights BL and BR. An AND gate, formed in part by two resistors RL and R2, is connected to the input of the transistor 23. A directional indicator or turn indicator in the flashing circuit is formed by a double changeover or transfer switch, i.e. a ganged double - pole doublethrow switch 20. The latter includes two joinly actuable sets of contacts 201 and 202. The first set of contacts 201 with outputs L and R is disposed in a direction indicating lamp circuit. The second set of contacts 202, connected in parralel, forms part of a switch-on circuit.

As soon as the switch 20 is moved to one of the two operating positions L or R, a positive potentail at a terminal 15 derived at an ignition switch, flows via contact 202 to the transitor 23. The transistor 23 is now pulsed on and off by pulses from the terminal A through the AND gate. One resistor R2 of the AND gate produces a switch-on condition and the second resistor RL of the AND gate conveys the pulsed signal from the output A. Current into the collector circuit of the transistor now flashes whichever of the lamps are connected.

In addition, a monitoring device 22, to which the monitoring light KBL is connected, is coupled in series with the lamp circuit by means of terminals 49 and 49A. The monitoring device 22 produces a warning signal from monitoring light KBL when one or both lamps BL or BR fail. A reduced load current serves to set off the signal in the light KBL. According to another embodiment of the invention, the warning signal is produced by incorporation of a buzzer or other audible signal.

Apart from being selectively switched on by the directional switch 20, that is by the turn indicator, the flashing lamps BL or BR are also controlled by a warning flasher switch 21. The outputs WL and WR of the switch 21 are connected to the lamps BL and BR respectively. When the warning flasher 21 is actuated, a positive potential applied permanently to a terminal 30 is connected to the positive terminal of the warning flasher switch, and then to the resistor R2 of the AND circuit. As described above a lamp energizing current passes through the transistor 23 and the monitoring device 22 to output terminal 49a. It then passes through the lead and terminal 49a to the warning flasher switch 21 and via a contact within the warning flashing switch 21 to the outputs WL and WR of the latter, to which the lamps BL and BR are connected. All these lamps now are flashed on and off.

Figure 2:
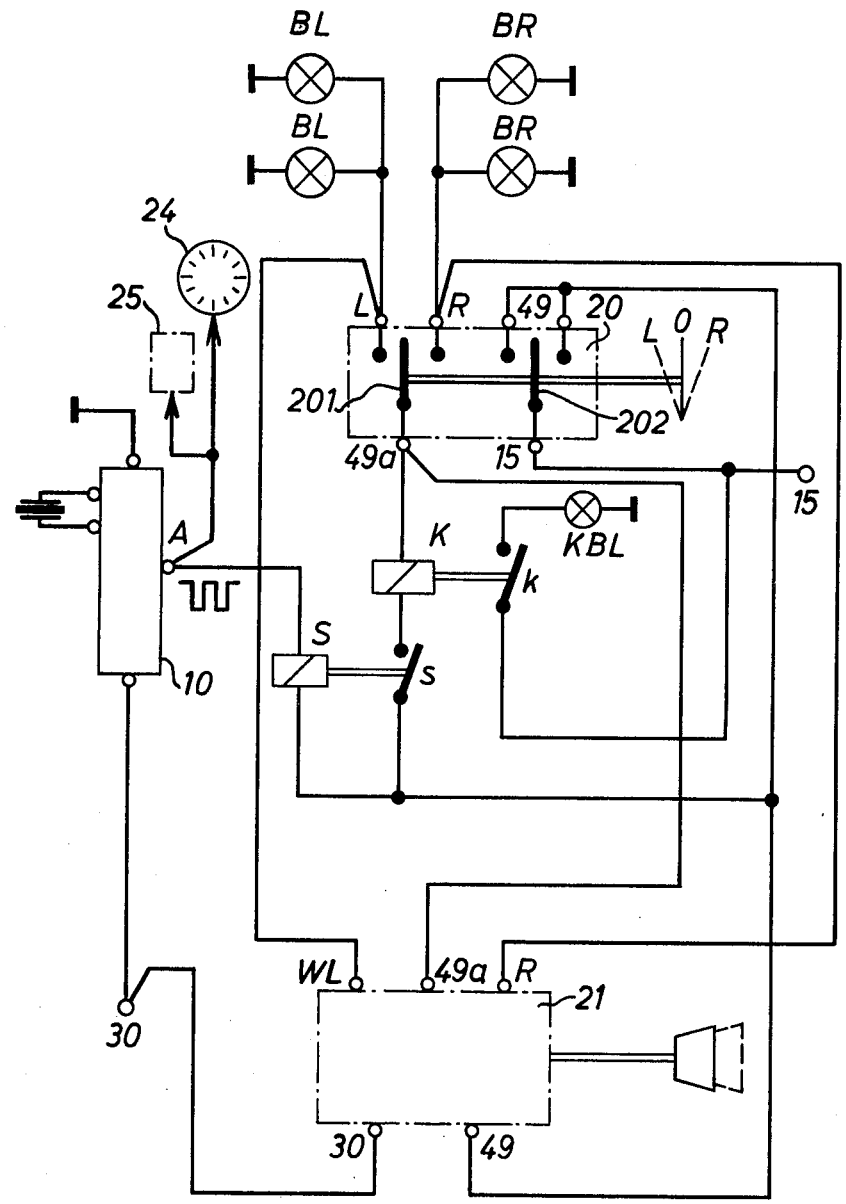

FIG. 2 illustrates an embodiment which differs mainly from the embodiment of FIG. 1 with regard to the components of the flashing circuit controlled by the pulse signals of the central pulse generator with its oscillator 10.

In FIG. 2, as soon as the directional switch 20 is moved to the operating position L or R, the pulse generator 10 supplies pulses to a circuit path which extends from terminal 15, through the changeover switch contact 202, outputs 49 and the electro-magnetic relay S. The relay S pulses periodically synchronously encloses the lamp circuit with its make contact s. A relay K in series with the lamp circuit performs a a monitoring function. As long as both lamps BL or BR are lit, the current through the relay K is large enough to energize it. The relay is slugged, that is it is provided with a means for extending the energizing pulse, long enough to keep its contact $K$ closed during and between adjacent current pulses. Thus contact $K$ keeps a circuit for a monitoring light KBL closed. However, a failure of one of the lamps BL or BR reduces the current sufficiently so that the slugging effect is no longer adequate to hold the relay K in its operative condition. The relay K then operates in synchronism with the pulses. The relay K then pulses the circuit of the monitoring light KBL synchronously with the pulse generator so as to produce a periodic signal.

The operation of the warning flashing switch 21, in other respects, is similar to that described in FIG. 1.

Figure 3:
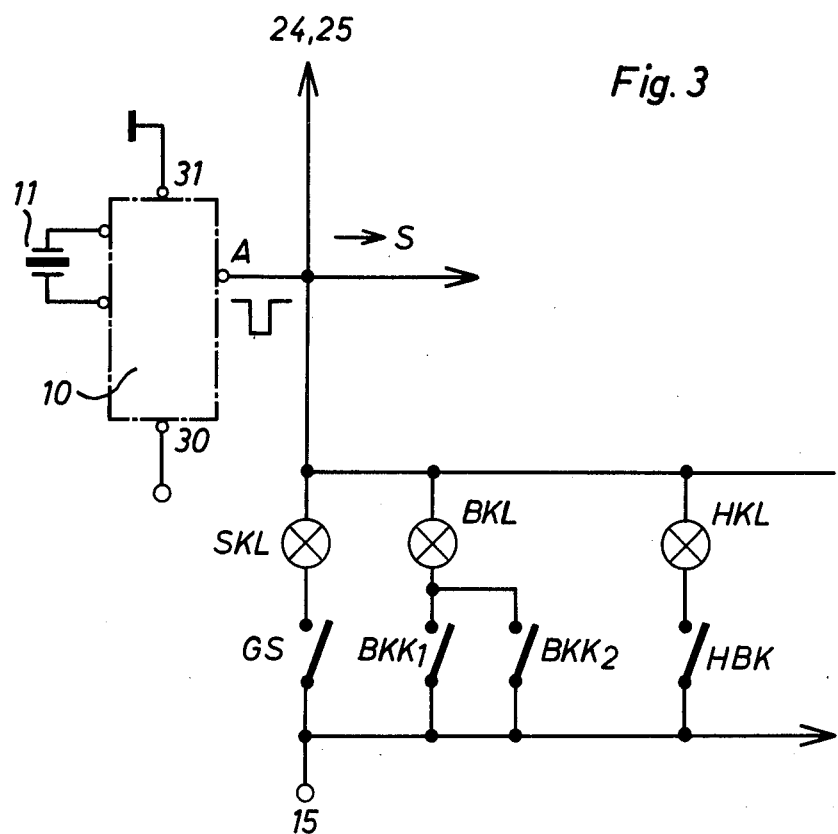
FIG. 3 is a circuit diagram illustrating additional indicator circuits that utilize periodic signals from a central pulse generator.

As shown in FIG. 3, alarm and monitoring circuits may also be connected to the output A of the central pulse generator 10 in order to obtain periodic indicator signals, alarm signals, or both. As shown, a safety monitoring light SKL is connected to the associated contact GS of the safety belt. The contact GS is opened only when the safety belt is used. When the safety belt is removed, the safety monitoring light SKL is periodically lit by the central pulse generator 10 with the ignition switch 15 closed.

In the same manner the brake monitoring light BKL is also lit by way of the brake monitoring contacts, e. g. the brake fluid switches BKK1 and BKK2, when there is a breakdown. The operation of the hand brake is indicated by the hand brake monitoring light HKL when the hand brake monitoring switch is closed. A flashing signal is produced when the hand brake is off.

According to one embodiment of the invention, the circuit of FIG. 3, outside of the pulse generator 10 represents and addition to the circuit of FIG. 1. According to another embodiment of the invention the circuit outside of the pulse generator 10, represents an addition to the circuit of FIG. 2. In each case the pulse generator 10 shown in FIG. 3 is the pulse generator shown in FIG. 1 or FIG. 2.

The AND gate of FIG. 1 has been described as composed of resistors $R_1$ and $R_2$. The transistor 23 may also be considered as part of the AND gate.

The positive potentials in the figures are derived from the ignition in the operating means OM which in turn receives its voltage from the battery B.

While embodiments of the invention have been described in detail it will be obvious to those skilled in the art that the invention may be embodied otherwise without departing from its spirit and scope.

What is claimed is:

1. An electrical system for a vehicle having a source, comprising a plurality of circuit means together providing safety and comfort services within and without the vehicle, pulse generator means energized by said source and having an output for generating a train of sequential pulses from said output, one of said circuit means including a plurality of turn indicator lamps and another of said circuit means being operable directly by said pulses, a plurality of current path forming coupling means, one of said coupling means connecting said output to the one of said circuit means and another of said coupling means connecting the source to the other of said circuit means and permitting current flow from the source to the other of said circuit means, a turn indicator mechanism, the other of said coupling means including switching means serially connected with said lamps and said turn indicator mechanism and coupled to the output for periodically interrupting the current flow between the source and the lamps in dependence upon the pulses from the output, said pulse generating means being continuously connected to the source and continuously supplying pulses from the output to each of said coupling means.

2. A system as in claim 1, wherein said switching means includes a relay.

3. A system as in claim 1, wherein said switching means includes an amplifier.

4. A system as in claim 1, wherein said one circuit includes monitoring means.

5. A system as in claim 1, wherein said lamps when turned on require a flow of current, said switching means when turned on carrying the circuit to said lamps, said pulse generating means being outside the flow of current to said lamps.

6. A system as in claim 1, wherein one of said circuit means includes monitoring means coupled by said one coupling means to said indicator mechanism for monitoring the operation of said lamps.

7. A system as in claim 1, wherein at least one of said circuit means operates in response to pulses at a given frequency, said one of said circuit means being a clock.

8. A system as in claim 1, wherein the one of said circuit means includes a clock and a third of said circuit means includes a heater control for a heater in the vehicle.

9. A system as in claim 1, wherein said turn indicator mechanism is manually actuated, wherein said switching means includes a gate enabled by actuation of said indicator mechanism, said gate being coupled to said output for passing current to each indicator mechanism when enabled.

10. A system as in claim 9, wherein said one coupling means includes a warning device connected in series between said gate and said indicator mechanism.

11. A system as in claim 9, wherein current passes from said generator means through said gate to said indicator mechanism and said lamps, said coupling means including monitoring means responsive to the current.

12. A system as in claim 11 wherein said monitoring means produces a warning signal when the current is less than a predetermined value.

13. A system as in claim 11 wherein said monitoring means includes a relay having a normally off contact and a characteristic for keeping said contact on for a predetermined time after the relay has been energized with a current beyond a predetermined value, said relay having a more rapid release characteristic after it has been energized with a current below the predetermined value so as to turn off the contact more rapidly when energized with pulses less than the predetermined value, said monitoring means including an alarm portion responsive to said contact being on.

14. A system as in claim 13, wherein said portion includes a light.

15. A system as in claim 9, wherein said indicator mechanism includes a switch and said switch is a transistor.

16. A system as in claim 9, wherein one of said circuit means includes a seat belt alarm.

17. A system as in claim 1, wherein said coupling means includes respective switches for a plurality of said circuit means and a monitor conected between the switches and said pulse generator means.

18. A system as in claim 1, wherein one of said circuit means includes a flasher mechanism.

19. A system as in claim 1, wherein one of said circuit means includes a manually started flasher mechanism, said coupling means including a gate enabled by starting of said flasher mechanism, said gate being coupled to said generator means and passing current to said flasher mechanism when turned on, said flasher mechanism supplying pulses to selected ones of said lamps.

20. A system as in claim 1, wherein one of said circuit means includes a seat belt alarm.

21. A vehicle as in claim 20, wherein said coupling means further include a manually starter flasher control selectively connecting said pulse generator to selected ones of said lamps.

22. A system as in claim 1, wherein one of said circuit means includes a brake circuit alarm.

23. A system as in claim 1, wherein said pulse generator means include frequency stabilizer means and an integrated circuit oscillator, and wherein said pulse generator means produces a train of negative pulses.

24. A vehicle, comprising operating means for moving and steering the vehicle, an energy source for said operating means, illuminating lamps responsive to said source, and plurality of safety signal lamps, a clock, pulse generator means responsive to said source for producing a continuous series of electrical pulses, coupling means coupling said signal generator means to said signal lamps and said clock for selectively applying pulses to said lamps and said clock, said coupling means including a manually operable turn indicator switch connecting selected ones of said lamps to said generator means.

25. A system as in claim 24, wherein said one of said coupling means includes monitoring means for monitoring the operation of said one circuit means.

26. An electrical system for a vehicle having a source comprising a manually actuable turn indicator, a plurality of indicator lamps, a pulse operated timing device, a pulse generator, switching means for periodically passing and interrupting current therethrough in response to pulses applied thereto, the source and said switching means as well as said turn indicator and said lamps being connected in series when said turn indicator is actuated and said pulse generator being continuously connected to the source and to said switching means as well as said timing device for continuously operating said timing device and simultaneously pulsing said switching means to pass and interrupt current flow to the lamps when the indicator is actuated.

* * * * *